(No Model.) 2 Sheets—Sheet 1.
C. C. CLAWSON.
AUTOMATIC WEIGHING AND PACKAGE FILLING MACHINE.
No. 315,730. Patented Apr. 14, 1885.
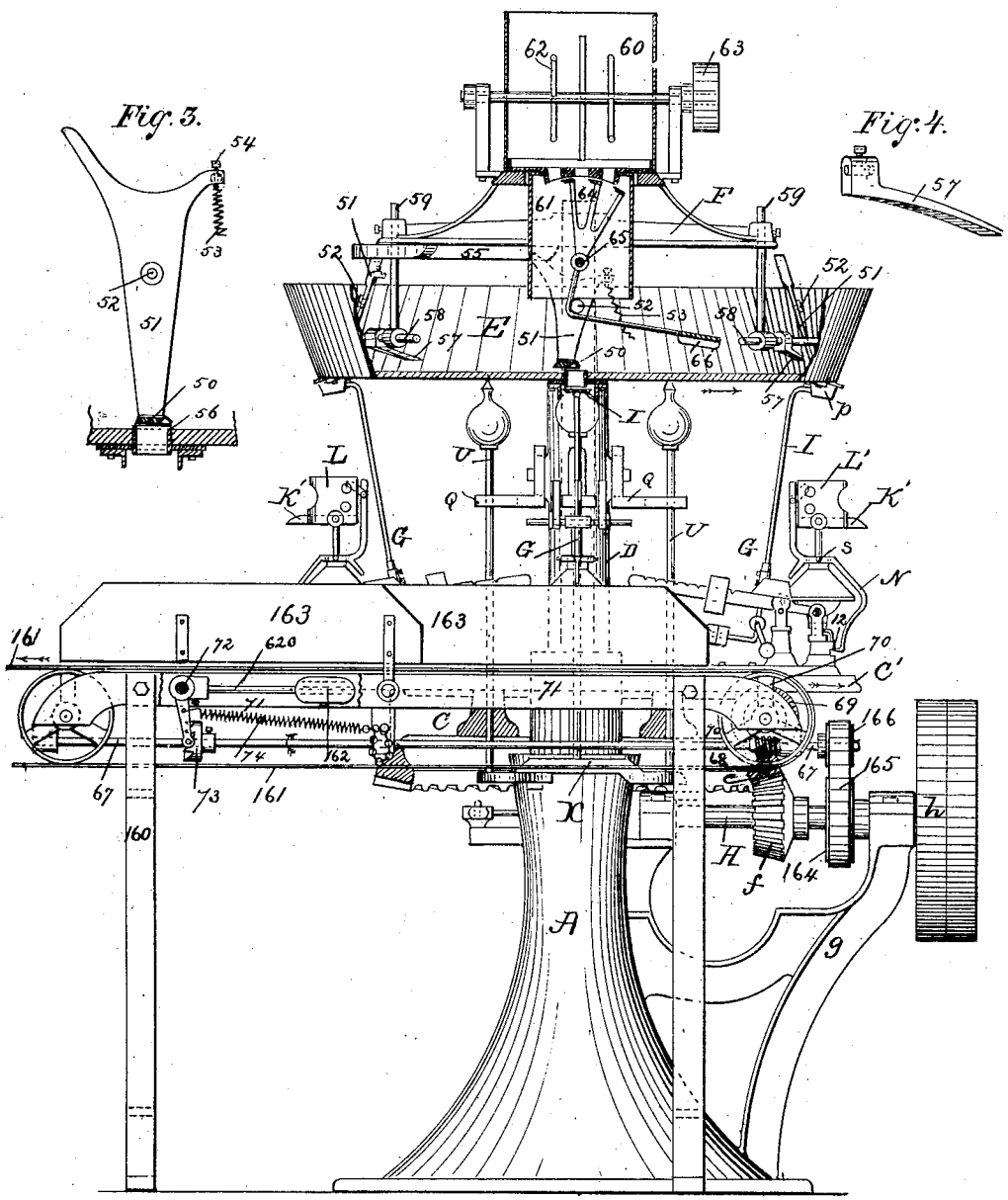
Witnesses.
W.B.M ssou
L.C.Hills.
Inventor.
Clement C. Clawson
by Chas. J. Hedrick
his attorney

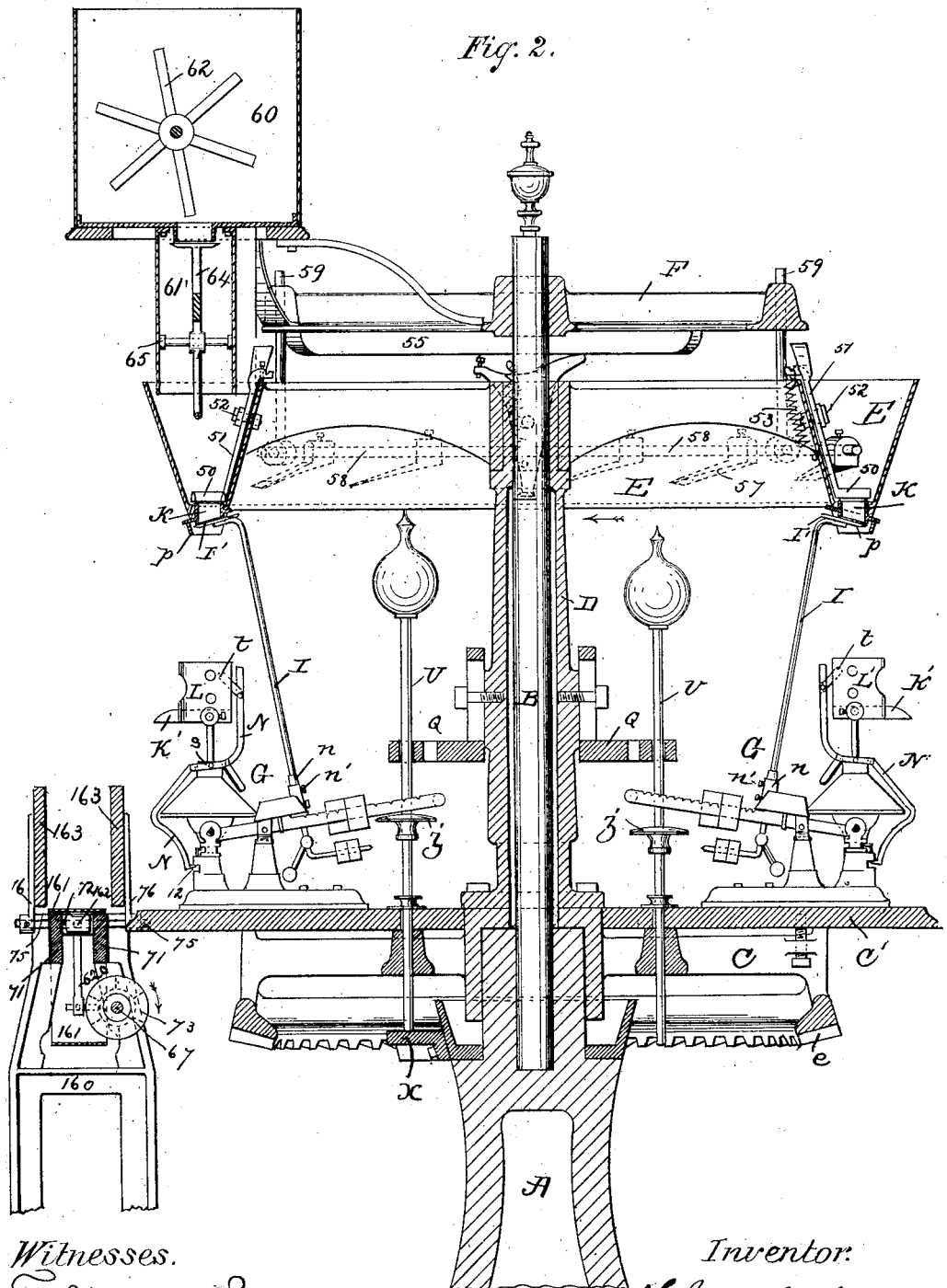

UNITED STATES PATENT OFFICE.

CLEMENT C. CLAWSON, OF NEWARK, NEW JERSEY, ASSIGNOR OF ONE-HALF TO THURBER, WHYLAND & CO., OF NEW YORK, N. Y.

AUTOMATIC WEIGHING AND PACKAGE-FILLING MACHINE.

SPECIFICATION forming part of Letters Patent No. 315,730, dated April 14, 1885.

Application filed November 12, 1884. (No model.)

*To all whom it may concern:*

Be it known that I, CLEMENT C. CLAWSON, a citizen of the United States, and a resident of Newark, Essex county, State of New Jersey, formerly of Raleigh, North Carolina, have invented certain new and useful Improvements in Automatic Weighing and Package-Filling Machines, of which the following specification is a full, clear, and exact description.

This invention has reference more particularly to machinery for filling packages of cardboard, paper, and other materials with equal weights of powdered substances—such as cornstarch, flour, and the like—and for settling the powder in said packages. The invention, or parts thereof, may, however, be applied to other kinds of machinery.

It consists in the combination, with a hopper and one or more automatic weighing-scales having supply-gates connected with and operated by said scales, of inclined blades for forcing or crowding the substance in the hopper into the said delivery opening or openings. By this means the flow of the powdered substance through the delivery-openings, which does not readily take place by the action of gravity alone, on account of the lightness of the material and its tendency to pack together, is assisted, so that a free delivery is obtained whenever the supply-gates are withdrawn.

Heretofore it has been common to feed light material through a hopper-opening by means of a screw; but, so far as I am aware, a screw-hopper has not been combined with an automatic weighing-scale having a supply-gate connected with and operated by the scale. It is found that the compacting of the powdered substance above the supply-gate does not interfere (the parts being properly proportioned) with the movements of the gate, but, on the contrary, that it has a beneficial effect in preventing the scale from rebounding when the load moves down the scale-pan and closes the gate.

The invention also consists in means for maintaining a uniform quantity of the powdered substance in the hopper. For this purpose the hopper is supplied through a spout in which is a cut-off for regulating the flow, and the position of this cut-off is controlled by a float which is acted upon by the substance in the hopper. When the substance accumulates to a sufficient depth, it stops the flow, and as the substance is drawn off it reopens the valve and lets the hopper fill up again.

The invention further consists in a tapping apparatus or attachment for shaking down the substance in the package, the same having one or more tappers or tapping-arms arranged to strike the bottom of the package. It is found that practically such tapping is much more effective in shaking down the substance than when the blows are made on the sides of the package.

The invention also comprises certain special combinations and arrangements of parts, as hereinafter set forth.

The accompanying drawings represent an automatic weighing and package-filling machine constructed in accordance with the invention.

Figure 1 is a front elevation, certain parts being shown in section; Fig. 2, a vertical cross-section, on a larger scale, in elevation, looking to the left of Fig. 1; and Figs. 3 and 4, detail views.

A is the base of the machine-frame, or, as hereinafter called, the "pedestal;" B, an upright stationary shaft having its lower end set (and keyed, if desired) in a socket in the pedestal; C, a rotary frame supported by and turning upon the top of the pedestal. C' is a marble top or table resting upon and turned with frame C; D, a hollow column bolted at the foot to the revolving frame, and at the upper end fitting around the upright stationary shaft, which forms a journal therefor; E, an annular hopper fixed to and supported by the hollow column; F, a spider-frame attached to the stationary shaft, and G a series of weighing-scales.

Motion is imparted to the frame C and table C' in the direction of the arrow through the bevel-gears *e* and *f* and the horizontal shaft H, that is journaled in bearings in the brackets *g*, and is driven by a belt running on the pulley *h*. Upon the table are placed weighing-scales G—say four in number, although there may be less or more. In the bottom of the hopper there are as many openings as there are scales on the table. The scales are alike, and the description of one will suffice for all. Attached to the beam just back of the fulcrum is the vertical arm I, to the upper end of which is fastened the gate I', that controls the delivery of the material from the hopper. Under each of the openings in the bottom of the hopper is a mouth-piece, K. Its lower edges lie in a plane inclined to the horizontal to the same degree as the gate I' when closed. This supply-gate works out of contact with but in close proximity to the said edges. The arm I is made adjustable, so that the proper relation of the gate to the hopper's mouth may be readily secured. As shown, the end of the arm fits in a socket-piece, $n$, attached to the scale-beam, and is held in place by a set-screw, $n'$, by loosening which the arm may be moved up or down. A small housing, P, is preferably secured under the mouth-piece. The scale-pan is provided with a vertically-adjustable package-support, K', having the laterally-adjustable gage plates L L'. The packages are placed on the support K between the gage-plates. The latch N is pivoted at $s$ to the scale-pan. At its lower end the said latch is adapted to engage the notch 12, and at its upper end is provided with a contact piece, $t$, to be struck by the carton or package when inserted, so as to press back the upper end of the latch and hold the lower end out of the notch. Above each delivery-opening in the hopper is placed an adjustable valve, 50, for regulating the size of opening, and thus controlling the delivery. It is attached to the lower end of the carrier 51, pivoted at 52 to the inner wall of the hopper. A spring, 53, (shown as spiral tension-spring,) tends to withdraw the valve so as to uncover the opening; but its action is resisted by the screw-stop 54. By adjusting the screw in the proper position the opening can be made larger or smaller, as described. In connection with these valves a cam, 55, is or may be employed. It is fixed to the spider-frame F, and is so arranged that as the valve-carriers 51 pass under it they are turned in the direction nearly to close the valves, leaving but a small opening. The object of this is to combine quickness with accuracy of weighing. The stop 54 is so adjusted that almost the desired weight will have passed through the opening by the time the valve-carrier reaches the cam. During this time the flow may be comparatively rapid. When the upper end of the valve-carrier strikes the cam, the valve is advanced and the material flows from the hopper in a fine stream, which favors accuracy in weighing. It is not, however, necessary to use the cam 55, for the valves can be adjusted so that the stream from the hopper is always small enough to secure accurate weighing. The valves 50 are supported above the bottom of the hopper in order to catch the material and force it into the opening. The better to accomplish this purpose, the edge of the mouth-piece K, which projects above the bottom of the hopper, is cut away at 56, and the front of the valve, which is made thick, is beveled. (See Fig. 3.) It is evident that a piece not adjustable, to act as a valve, could be used for this purpose of forcing the material into the opening. It is preferred, however, to make the valve perform the double function. The valves or raised pieces 50 are assisted in their work of forcing the material through the openings by the inclined blades 57, which are set at intervals on the stationary curved rod 58. This curved rod is attached to and supported by the pendent rods 59 from the spider-frame F. As the hopper revolves, it carries the substance therein under the inclined blades, which compact the substance at the bottom of the hopper, and also force it into the delivery-openings. At the same time they hold back the substance or material, so that it does not move around quite so fast as the hopper. Consequently the valves or raised pieces plow their way (so to speak) through the compacted material, and the result is a steady and practically uniform delivery of the material or substance from the hopper. The material is fed into the hopper from the bin 60 through the spout 61. In the bin 60 is a stirrer, 62, which is kept in continual rotation by a belt on pulley 63. At the bottom of the bin is the cut-off 64, pivoted at 65 to the spout, and controlled by the float 66. This float consists of a metal plate, which preferably has the edges bent down, as shown. As the material is carried under the plate, it holds it up, and thus regulates the position of the cut-off. When sufficient material has collected in the hopper, it stops entirely the flow from the bin.

For each weighing-scale on the rotary table C' is a sliding rod, U, supported partly in the frame C and partly in the bracket Q, which rod is lifted once in a revolution of the latter by a stationary cam, X, fixed to the pedestal. Each rod has a device, $z'$, fixed on the rod just under the scale-beam. When the rod U is raised, it prevents the scale-pan from rising and the supply-gate I' from opening. The main object of using these rods U and cam X is to insure that the gate shall be closed during removal of the full package from the scale-pan and the insertion of an empty one. They also allow the supply-gate to open gradually.

The tapping apparatus or attachment for shaking down the material in the packages after it has been weighed into them is placed at the front of the machine. It consists of a supporting-frame, 160, a conveyer-belt, 161, a tapper or tapping-arm, 162, arranged under the belt, the operating mechanism, and the side plates, 163, for retaining the packages in place on the belt. The conveyer-belt 161 is revolved at a speed corresponding with that of the table C', so that it will hold the packages as fast as they are filled with the material. It is driven from the pulley 164 on shaft H of the machine through the belt 165, pulley 166 on shaft 67, worm 68 on said shaft, and larger worm-gear 69 on the journal of pulley 70 at the right end, Fig. 1, of the frame. The belt travels over, and when loaded with packages rests upon the side pieces 71 of the frame. Between these side pieces is the tapper 162, mounted on the horizontal arm of bell-crank lever 620, supported and turning upon the pin or rod 72. It is vibrated by the conjoint action of a ratchet-wheel, 73, and a spring, 74, (shown as a spiral spring,) fastened at one end to the depending or short arm of lever 620, and at the other to a pin on the frame. The ratchet-teeth acting against a pin in the lower end of the short arm of lever 620 withdraw the tapper against the action of the spring, and when they release it the spring throws it up, so that it gives a smart blow directly up on the under side of the belt, and indirectly—that is, through the belt—upon the bottom of the package. The side plates, 163, are supported upon the studs or pins 75, which project laterally from the side pieces by arms 76, where hubs fit over the said studs or pins, and are held thereon by set-screws, so that the said plates are adjustable toward and away from each other. The packages as they are taken from the weighing-scales are placed upright on said conveyer-belt, and as they pass over the tapper have their contents shaken down. The conveyer-belt can be extended to any distance to the workmen whose duty it is to close and seal up the packages. The belt passes or may pass over the top of a table at which the workmen are seated.

The operation of the machine or apparatus is as follows: The scales being all latched down, so that all the gates I' are closed, and the valves 50, package-supports K', gage-plates L L', and the scale-weights being properly adjusted, the hopper E is filled to the proper depth—say one-third—with the material to be weighed and packed, the bin is also filled, and the machine is started. The table C' being revolved, the scales are successively made to pass the attendant, who is stationed in front of the cam X. As they come opposite him, he places a carton or empty package between the gage-plates L L' until he presses back and releases the latch N. The scale-pan, with its carton or package, does not, however, rise immediately, because the rod U is still raised by the cam X, and the device z' upholds the scale-beam, keeping the gate I' closed. As the rod U is gradually allowed to descend, the gate I' opens and allows the material to descend into the carton or package. The powdered material in the hopper is forced through the delivery-openings in a constant stream by the combined action of the inclined blades 57 and valves or raised pieces 50. If the cam 55 be used, the valves 50 are nearly closed as the scales come under it, so that a fine stream is delivered. This change takes place after the bulk of the charge has been delivered into the package. When the full charge has been received, the scale-pan descends, closing the supply-gate I' and stopping the delivery. After the delivery ceases, the rod U is again raised by the cam X, when the full package is removed and a fresh one put on its place. As soon as the full package is removed, the latch N immediately drops into engagement with the notch 12, and if the attendant should neglect to insert an empty carton it would continue to hold down the scale and keep closed the gate until released by the insertion of a fresh package. Should the attendant not remove a full package, its weight would of course keep the gate I' closed. The packages as they are removed from the scales are placed on the conveyer-belt 161, and by it carried above the tapper 162, which shakes down the contents, and thence to the workman who seals the packages.

If it be not desired to use the tapper, it can be thrown out of action by releasing the tension of the retractile spring 74.

Modifications may be made in details without departing from the spirit of the invention, and parts of the invention may be used separately.

Some new improvements in the weighing-scales are shown herein, as well as in my application filed of even date herewith, and officially numbered 147,801. No claim is, however, made herein to any matter shown in that application; but it is designed to claim all such matters therein, so far as they may be new.

Having thus explained the nature of the invention and the manner in which the same is or may be carried into effect, what I claim, and desire to secure by Letters Patent, is—

1. The combination, with a hopper and one or more automatic weighing-scales supplied from said hopper, and provided with a gate connected with and operated by said scales to control the delivery, of one or more inclined blades for forcing the material in the hopper through the delivery opening or openings, substantially as described.

2. The combination, with an annular hopper having one or more delivery-openings, of one or more inclined blades placed therein, substantially as described.

3. The combination, with a revolving hopper, of one or more inclined stationary blades set therein, substantially as described.

4. The combination, with the revolving hopper having one or more delivery-openings, of the raised pieces elevated above the bottom of the hopper at the delivery-openings for forcing the material into said openings, substantially as described.

5. The combination, with the revolving hopper having one or more delivery-openings, of the raised pieces at the said openings, and the stationary inclined blades set in said hopper, substantially as described.

6. The combination, with the revolving hopper having one or more delivery-openings, of the raised pieces at said openings, adjustable to act as valves, substantially as described.

7. The combination, with the revolving hopper, of the cut-off, and the float placed in said hopper and adapted to be lifted by the solid material therein, substantially as described.

8. The combination, with one or more automatic weighing-scales and a hopper for supplying material thereto, of a cut-off and float for maintaining constant the level in said hopper, substantially as described.

9. The combination, with the stationary bin, the stirrer in the bin, the spout, and the cut-off, of the revolving hopper, and the float connected with said cut-off, substantially as described.

10. A tapping apparatus for shaking down material in packages, comprising a tapping-arm or tapper movable vertically and arranged to strike the bottom of the packages, in combination with mechanism for operating said arm or tapper, substantially as described.

11. The combination, with an endless belt or conveyer, of a tapping-arm or tapper arranged under said belt or conveyer, and the mechanism for operating said arm or tapper, substantially as described.

12. The combination, with an automatic weighing and package-filling machine, of a tapping apparatus or attachment having a tapping-arm or tapper arranged to shake down the material by tapping the bottom of the packages, substantially as described.

13. The combination, with an automatic weighing and package-filling machine comprising a rotating table and automatic weighing-scales thereon, of the tapping attachment comprising an endless belt receiving motion from the said machine and placed in proximity thereto, a tapping-arm or tapper under said belt, and the mechanism for operating said arm or tapper, substantially as described.

14. The combination, with an automatic weighing and package-filling machine comprising the revolving table, the revolving hopper, the stationary inclined blades, the raised pieces at the delivery-openings in said hopper, the supply-gates, and the weighing-scales controlling said gates, of the tapping attachment receiving motion from said machine and placed in proximity thereto, substantially as described.

15. The combination, with a hopper and an automatic weighing-scale supplied therefrom, of a valve and cam for operating said valve to diminish the stream flowing from said hopper after the scale has received part of its charge, substantially as described.

16. The combination of the revolving hopper, the revolving automatic scales, the valves at the the delivery-openings in said hopper, and the stationary cam for operating said valves to diminish the flow of material through said openings, substantially as described.

In testimony that I claim the foregoing as my invention I have signed my name to this specification, in presence of two witnesses, this 29th day of October, 1884.

CLEMENT C. CLAWSON.

Witnesses:
GEO. W. WILKINS,
C. J. HEDRICK.